(12) United States Patent
Hoyt et al.

(10) Patent No.: US 8,473,834 B1
(45) Date of Patent: Jun. 25, 2013

(54) DYNAMIC PORTAL MENU AND MESSAGE SYSTEM AND METHOD

(75) Inventors: Ronald A. Hoyt, Carrollton, TX (US); Farrel B. Layton, Apache Junction, AZ (US); Scott E. Kornack, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1380 days.

(21) Appl. No.: 11/983,304

(22) Filed: Nov. 8, 2007

(51) Int. Cl.
 *G06F 17/00* (2006.01)
(52) U.S. Cl.
 USPC .......................................................... 715/202
(58) Field of Classification Search
 USPC .......................................................... 715/202
 See application file for complete search history.

(56) References Cited

U.S. PATENT DOCUMENTS

| | | | |
|---|---|---|---|
| 5,729,734 A | 3/1998 | Parker et al. | |
| 6,208,984 B1 | 3/2001 | Rosenthal | |
| 7,380,202 B1* | 5/2008 | Lindhorst et al. | 715/204 |
| 7,464,369 B1* | 12/2008 | Banerjee et al. | 717/106 |
| 7,650,571 B2* | 1/2010 | Sinai | 715/738 |
| 8,312,516 B1* | 11/2012 | Malatesta | 726/5 |
| 2003/0187998 A1* | 10/2003 | Petit | 709/229 |
| 2003/0225765 A1* | 12/2003 | Frieden et al. | 707/9 |
| 2004/0268228 A1* | 12/2004 | Croney et al. | 715/505 |
| 2005/0182742 A1* | 8/2005 | Griffin et al. | 707/1 |
| 2005/0257245 A1* | 11/2005 | Patrick et al. | 726/1 |
| 2006/0069666 A1* | 3/2006 | Burke et al. | 707/2 |
| 2007/0271330 A1* | 11/2007 | Mattox et al. | 709/203 |
| 2008/0046825 A1* | 2/2008 | Bedi et al. | 715/742 |
| 2009/0031004 A1* | 1/2009 | Yagoda et al. | 709/218 |
| 2009/0055545 A1* | 2/2009 | Saba | 709/229 |
| 2010/0042709 A1* | 2/2010 | Liesche et al. | 709/222 |

FOREIGN PATENT DOCUMENTS

JP 2007065971 A * 3/2007

OTHER PUBLICATIONS

Evjen et al., Professional asp.net 2.0 Special Edition, Wrox, Oct. 16, 2006, p. 787-834.*

* cited by examiner

*Primary Examiner* — Frank D Mills

(57) ABSTRACT

A method for a dynamic portal menu and message system. The method includes receiving, in a web service, a web service call from a web part. The method also includes transmitting a procedure call, corresponding to the web service call, to a database server. The method also includes receiving, from the database server, unformatted data corresponding to the procedure call. The method also includes formatting the unformatted data to produce a formatted data. The method also includes transmitting the formatted data to the web part. A data processing system and a dynamic portal system are also discussed.

16 Claims, 5 Drawing Sheets

200

DYNAMIC PORTAL MENU AND MESSAGE SYSTEM AND METHOD

TECHNICAL FIELD

The present disclosure is directed, in general, to messaging and portals for data processing system networks.

BACKGROUND OF THE DISCLOSURE

A "web portal" is a site or interface, typically accessible by a web browser, that functions as a point of access to information on a network such as the Internet or a private network. Portals present information from diverse sources in a unified way. Public web portals typical offer other services such as news, stock prices, infotainment and various other features. Portals provide a way for enterprises to provide a consistent look and feel with access control and procedures for multiple applications, which otherwise would have been different entities altogether.

SUMMARY OF THE DISCLOSURE

According to one disclosed embodiment, there is provided a method for a dynamic portal menu and message system. The method includes receiving, in a web service, a web service call from a web part. The method also includes transmitting a procedure call, corresponding to the web service call, to a database server. The method also includes receiving, from the database server, unformatted data corresponding to the procedure call. The method also includes formatting the unformatted data to produce a formatted data. The method also includes transmitting the formatted data to the web part.

According to another disclosed embodiment, there is provided a data processing system comprising a processor and accessible memory, the data processing system executing a web service. The web service is configured to receive a web service call from a web part. The web service is also configured to transmit a procedure call, corresponding to the web service call, to a database server. The web service also is configured to receive, from the database server, unformatted data corresponding to the procedure call. The web service is also configured to format the unformatted data to produce a formatted data. The web service is also configured to transmit the formatted data to the web part.

According to another disclosed embodiment, there is provided a dynamic portal system, including a database server, an administration server, and a web services server. The web services server is connected to communicate with a portal server, the database server and the administration server. The web services server is configured to perform the steps of receiving a web service call from a web part, transmitting a procedure call, corresponding to the web service call, to a database server, receiving, from the database server, unformatted data corresponding to the procedure call, formatting the unformatted data to produce a formatted data, and transmitting the formatted data to the web part.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
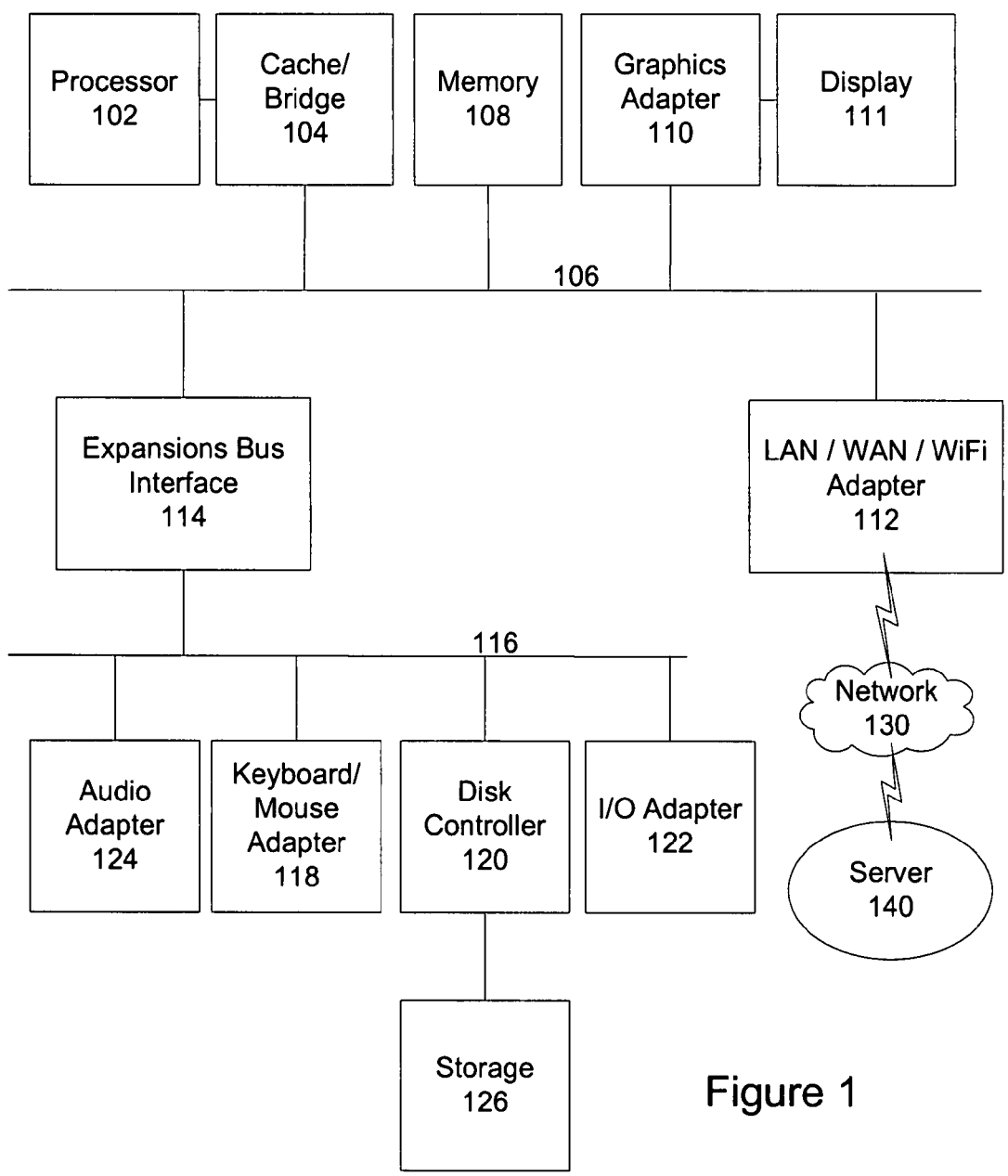
FIG. 1 depicts a block diagram of a data processing system in accordance with a disclosed embodiment.

FIGS. 1 through 5A and B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

It is often necessary to have a centralized application that has access to various other applications within the same enterprise to share the information across the applications. Also the various users with different roles accessing the different applications prefer to have a single access point to all of them over the Internet. Users may prefer to personalize the applications and have the coupled applications coordinated. Administrators may also prefer to have administrative tools all in a single place to administer all the applications. As disclosed herein, these goals can be met using portals. Since all the applications share information through portals, there is better communication between various types of users. Another advantage of portals is that they can make event-driven campaigns. Other advantages of portals as disclosed herein include intelligent integration and access to enterprise content, applications and processes, and improved communication and collaboration among customers, partners, and employees.

Other advantages can include unified, real-time access to information held in disparate systems, personalized user interactions, and rapid, easy modification and maintenance of the website presentation.

A portal as disclosed herein will preferably include a consistent look and feel, with consistent headers and footers, color schemes, icons and logos which gives the user a feel and sense of consistency, uniformity, and ease of navigation. A portlet is an application within a browser window, displayed in an effective layout, and is itself a web application. Portlets are aggregated by the portal page for user access.

The SharePoint Portal Server® line of products sold by Microsoft® have been gaining popularity among corporations for building their portals, partly due to the tight integration with the rest of the Microsoft Office® products. Presenting custom menus and messages on such a web portal is difficult when it is necessary to present multiple applications and multiple user roles. The nature of a custom menu or message means that a user has to have a specific role for a specific application in order to have access to it. The resulting complex matrix of possibilities is compounded further when multiple clients and multiple access points to an application are involved.

A Dynamic Portal Menu and Message System (DPMM) is disclosed herein. In conventional systems without DPMM portal menu links and message displays are limited to the web part level. This means that user are typically either authorized or not authorized to see a web part and that authorization logic meant either displaying a web part or hiding a web part. A great deal of manual portal configuration is required in conventional systems for anything more than simple link presentment and simple message presentment.

Additionally, both initial setup and subsequent changes of conventional systems involve manual programming updates to web parts or additional web parts. Any changes to a menu or a message required programmer skills to perform, followed by appropriate testing, approvals and migration procedures.

FIG. 1 depicts a block diagram of a data processing system in accordance with a disclosed embodiment, to host a portal server system or as a client system. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EE-PROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. Server system 140, implemented as a data processing system 100, can function as the portal server system described herein.

Two items of common functionality on a web portal are menu areas and message areas. It is typically necessary for the content that is presented in these areas to be filtered and presented (or customized) for each user in an automated fashion, based on a user's authorization.

Menu areas contain links to internal and external web sites, web applications, specific functional areas within such web sites and web applications and to other areas within the portal. Multiple menu areas are needed to organized links by business areas, application groupings, action categories, and other organizational approaches.

Message areas can contain text for a wide variety of uses. These can include general announcements at the top level of a web portal, information that is specific to a certain functional area, information for a specific application, information for a specific client, instructions for particular tasks or applications, help-information, contact information, news areas, lists, reporting information and many other uses for text presentment on a portal. Such message areas can also contain web links and email links.

Authorization for custom menu areas and message areas can be difficult to manage on conventional systems, such as one based on the Microsoft SharePoint® web portal, since multiple applications, multiple user roles and multiple clients create a large matrix of possible authorization combinations.

The nature of a custom menu item or message item (items) means that a user has to have a specific role for a specific application area in order to have access to such items. On a Microsoft SharePoint® web portal, for example, one or more items are contained within what is called a "web part" and security is maintained at the web part level. This means that users are either authorized or not authorized to see a web part. The related authorization logic is limited to either displaying or hiding a web part.

This limited security concept on conventional systems is problematic in that much manual portal configuration is required for anything more than simple link presentment and simple message presentment. For example, a menu area containing 50 possible menu items would need to be presented as 50 web parts instead of one if users can have some, but not all 50 items. The 50 web parts would then be listed and assigned separately by web part name on the portal security database.

As another example of the inefficiencies of current systems, a message area for application help for multiple clients in a typical system needs to be created and maintained as many web parts if different clients are to be given different instructions, phone numbers and contact links.

As another example of the inefficiencies of current systems, both initial setup and subsequent changes to conventional portals involve manual programming updates to web parts or the creation of new web parts. Any changes to a menu or a message requires programming skills to perform, followed by appropriate testing, approvals and migration procedures.

The disclosed Dynamic Portal Menu and Message System (DPMM) can be used in conjunction with of a portal web site that has been developed using a conventional tool such as Microsoft SharePoint® portal software. Such a portal web site can have one or more menu areas and one or more message areas. These menu and message areas contain items and the items are granted to roles. These roles are then granted to users. Menu items, message items, roles and users are maintained through an administration web site and through automated interfaces.

DPMM dynamically populates menu and message web parts with content that is maintained through the preferably separate administration web site. This means that authorization logic is no longer limited to displaying or hiding a web part. The actual content of a web part is dynamically built based upon what a user has authorization to see. This means increased access control granularity since access is given for "part of a part."

Items can be created and granted to roles that are then granted to users. Different clients can receive different sets of roles. The same menu item or message item can be granted to many different roles. This allows complex combinations of security needs to be easily met.

In this way, the user only sees messages he is specifically authorized to see and only sees links to application functionality he is specifically authorized to access based upon the roles he has been granted.

Various embodiments of the disclosed DPMM solve the problems presented by maintaining the content in a separate DPMM database through a separate administration web site. Menu and message area web parts on the portal are dynamically populated by calling web services that retrieve the data from the DPMM database.

Various embodiments of the disclosed DPMM differ in one respect from known techniques in that authorization logic is no longer limited to displaying or hiding a web part. Individual web parts can be created to correspond with logical business requirement concepts. The content of a web part is dynamically built based upon what a user has authorization to see instead of just having the whole web part displayed or hidden.

On the DPMM administrative web site, in some embodiments, maintenance is now much easier for menu and message items. Items can be created, granted to web parts and granted to roles that are then granted to users. Different clients can receive different sets of roles. The same menu item or message item can be granted to many different web parts and granted to many different roles. A user can have many roles. Duplicate items that would be returned within the same web part due to multiple roles are eliminated when returned by a display process. This allows complex combinations of security needs to be easily and efficiently met.

For example, a menu area containing 50 possible menu items can now be presented as a single web part, regardless as to the authorization design of the individual menu items since that aspect is maintained through the separate administration web site instead of on the portal itself.

As another example, a message area for application help can now be created as a single web part even if different clients are to be given different instructions, phone numbers and contact links.

Various embodiments of the disclosed DPMM address the issues above since changes to existing portal web part content no longer require programming skills to perform. In other words, portal menu and message maintenance is now a data change instead of a coding change. Content changes can easily be made on the administration web site by non-programmers and only data verification is needed. Testing, approvals and code migrations are no longer needed since code is not being changed. This reduces cost and increases speed and quality for portal menu and message maintenance.

Figure 2:
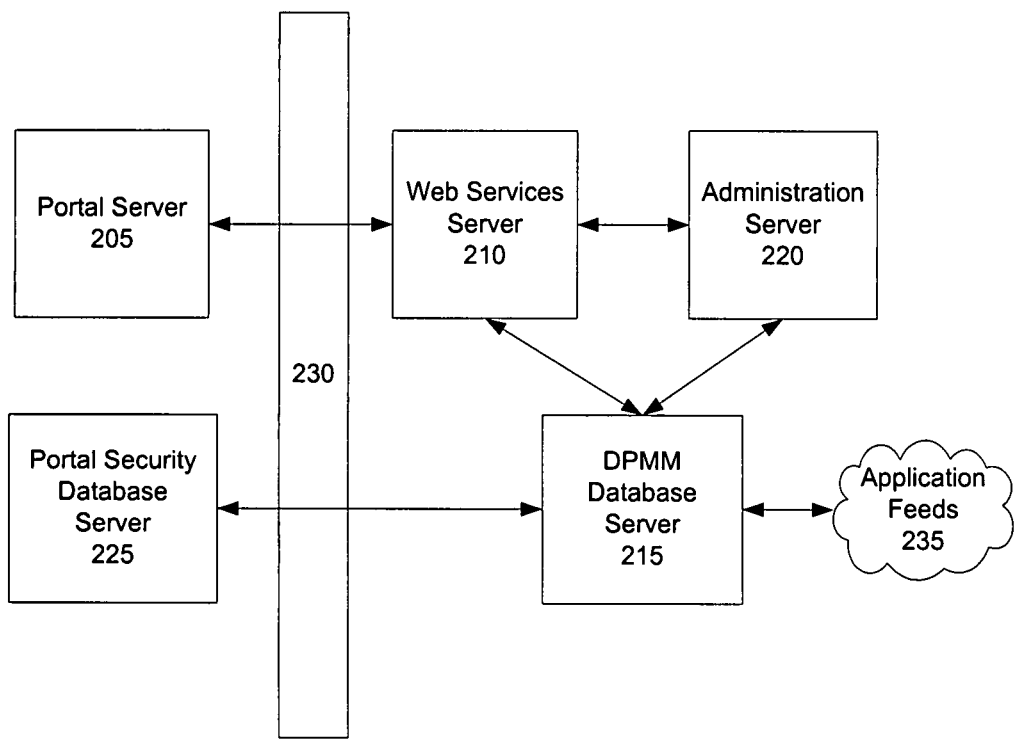
FIG. 2 depicts a block diagram of a dynamic portal menu and message system in accordance with a disclosed embodiment.

FIG. 2 depicts a block diagram of a dynamic portal menu and message system 200 in accordance with a disclosed embodiment.

A portal web site resides on and can be transmitted to a client system by a portal server 215. Portal server 215 contains custom web parts for the purposes of presenting role-specific menu areas and message areas.

The custom web parts on portal server 215 interacts with web services server 210. The custom web parts call web services residing on web services server 210, providing a user ID and the web part ID.

The web services on web services server 210 call database stored procedures in a DPMM database residing on a DPMM database server 215. The stored procedure returns data to the web service, which formats and returns the data to the calling web part.

An administrative web site resides on an administration server 220 and is used to manually maintain menu and message data that is housed in the DPMM database on DPMM database server 215.

Application feeds 235 containing user and role information are received from supported applications and are applied to the DPMM database on DPMM database server 215 in an automated fashion. This information is then applied to the portal security database residing on portal security database server 225.

The various server systems described herein can be implemented, for example, as a data processing system 100. Further, though each server system is shown here as being a separate and independent system, those of skill in the art will recognize that multiple ones of these servers can be implemented on a common data processing system, within the scope of the claims, as long as they perform the claimed functions of the respective servers.

Figure 3:
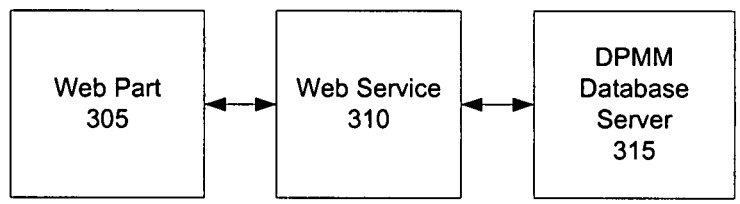
FIG. 3 depicts a simplified block diagram of dynamic portal menu and message system components that interact with each other.
Figure 4:
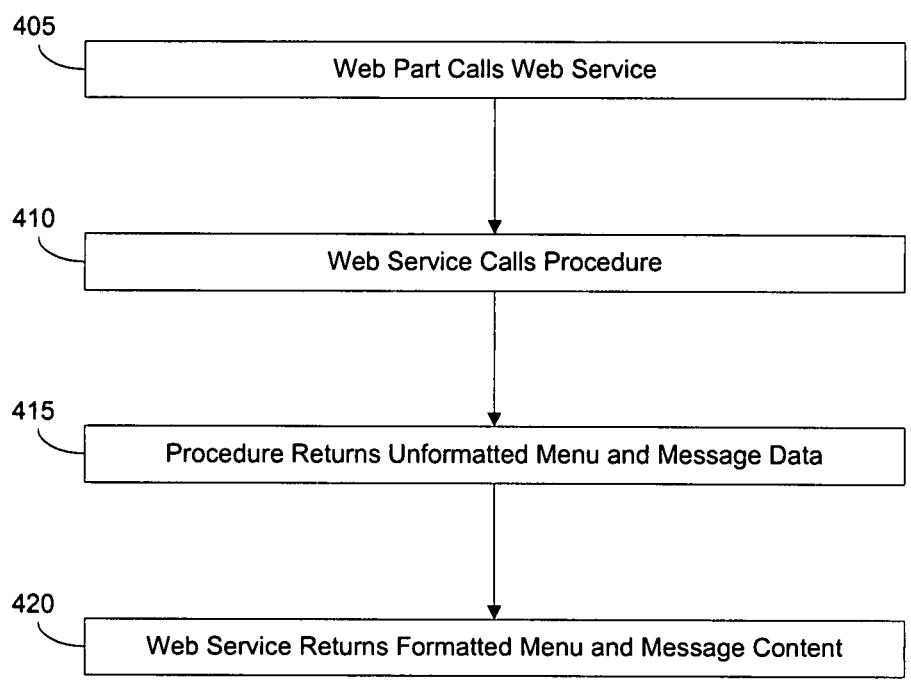
FIG. 4 depicts a flowchart of a corresponding process in accordance with various disclosed embodiments.

FIG. 3 depicts a simplified block diagram of DPMM components that interact with each other; and FIG. 4 depicts a flowchart of a corresponding process in accordance with various disclosed embodiments. Together, these figures as helpful to describe a DPMM web service usage concept in accordance with disclosed embodiments.

Here, the web part 305 calls a web service 310 providing a User ID and a Web Part ID (step 405). The web service receives this web service call.

Next, the web service 310 calls a stored procedure on the DPMM database server 315 (step 410), by transmitting a procedure call, corresponding to the web service call, to the DPMM database server.

Next, the stored procedure on the DPMM database server 315 returns unformatted menu or message data to the web service 310 (step 415).

Next, the web service 310 formats the menu or message data and returns formatted content to the web part 305 (step 420).

Figure 5A:
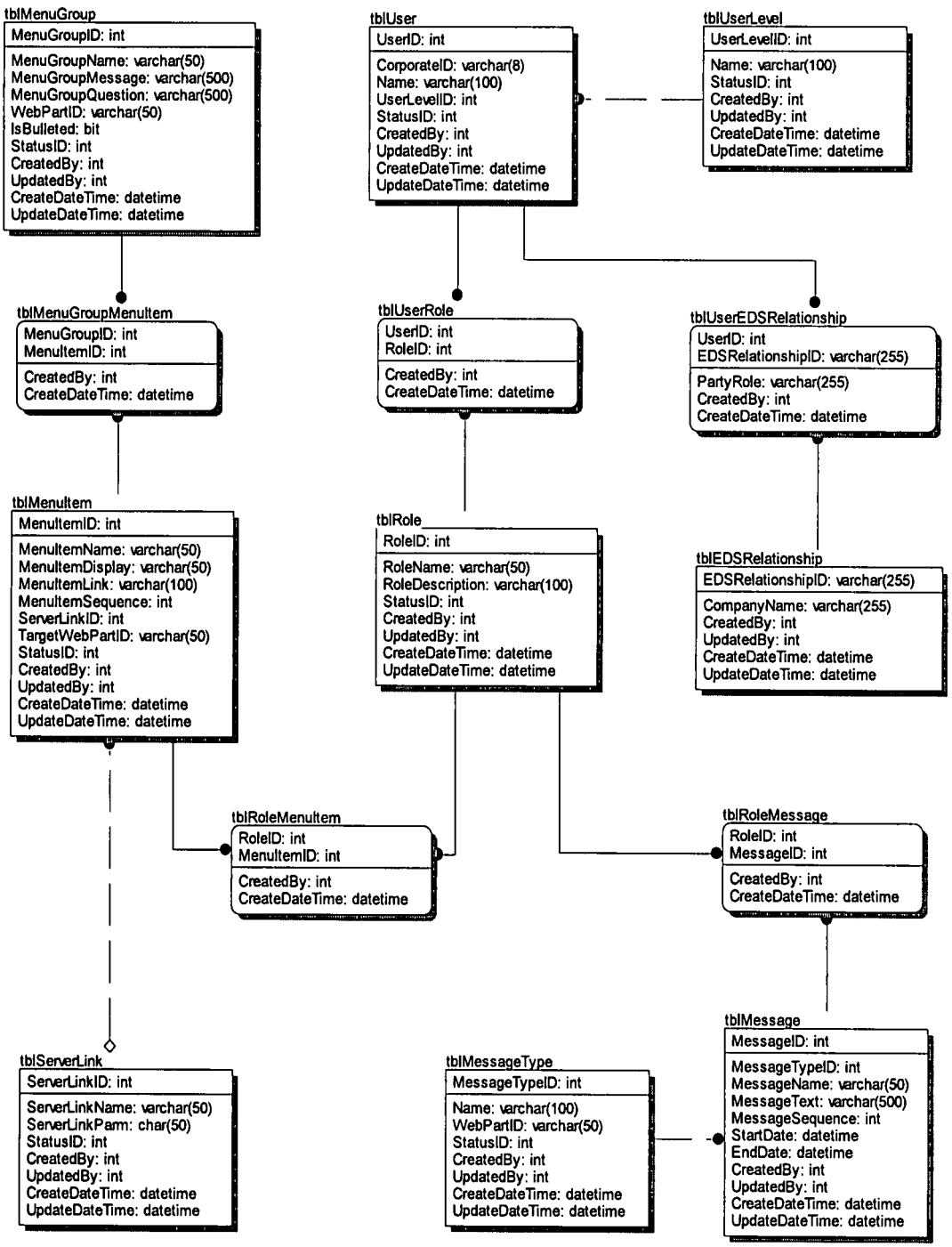
FIGS. 5A and 5B illustrate a database storage system schema and structure, in accordance with various disclosed embodiments.
Figure 5B:
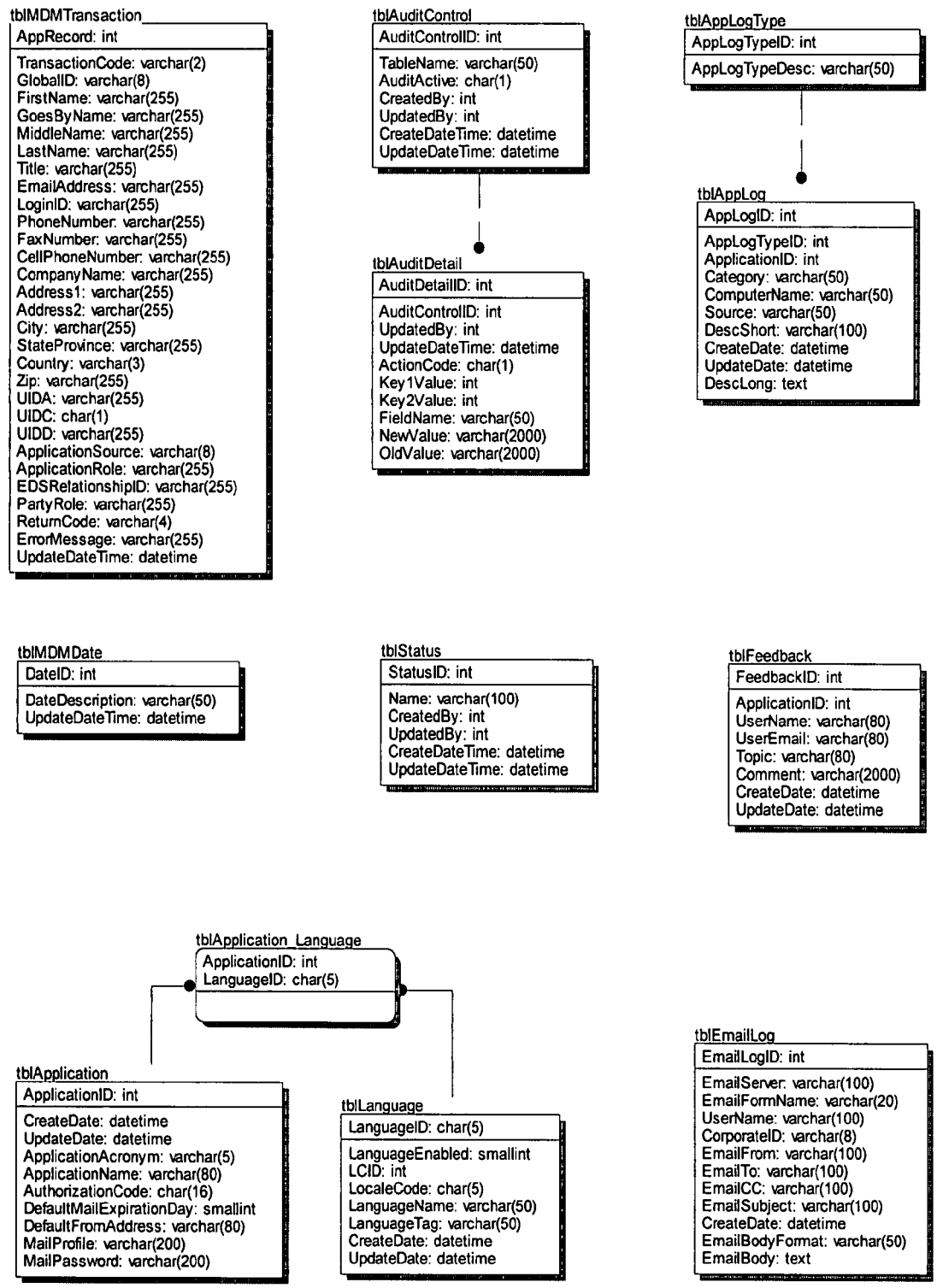

FIGS. 5A and 5B illustrate a database storage system schema and structure, in accordance with various disclosed embodiments, that can be used for the DPMM database on the DPMM database server.

Disclosed embodiments therefore provide a dynamic portal menu and message system and method for use with web portals, including those developed with commercial products such as Microsoft SharePoint® products. These embodiments provide dynamically populated menu web parts and message web parts. Various embodiments include a menu web service that populates the web parts and message web service that populates the web parts.

Various embodiments also include an administrative web site, and the ability to simulate portal web part content. Various embodiments also include the ability to authorize administrative users to maintain menus, messages, users or all three as a part of an administrative web site.

Various embodiments casn maintain an audit trail of manual modifications made through the administrative web site, an audit trail of errors logged by the administrative web site, and an audit trail of emails made through the administrative web site.

Various embodiments also include a method of loading application feeds, a method of validating data, a method of extracting error messages, and a method of extracting a security database feed.

According to various embodiments, the unformatted data is menu data. According to various embodiments, the unformatted data is message data. According to various embodiments, the web service call includes a Web Part ID. According to various embodiments, the web service call includes a User ID. According to various embodiments, wherein the formatted data comprises at least a portion of a dynamically generated web portal. According to various embodiments, the database server maintains a data structure including menu data, message data, and an assignment of the message data and menu data to user roles. According to various embodiments, the data structure further includes an assignment of user roles to a plurality of users, and assignment of menu items to a plurality of menu groups, and an activity log. Various embodiments include comprising transmitting simulated web portal content from the web service to an administration server. According to various embodiments, the database server is managed by an administration server capable of modifying message data, menu data, and user data.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction or signal bearing medium utilized to actually carry out the distribution. Examples of machine usable or machine readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for a dynamic portal menu and message system, comprising:
   receiving, in a web service, a web service call from a web part;
   transmitting a procedure call, corresponding to the web service call, to a database server;
   receiving, from the database server, unformatted data corresponding to the procedure call, wherein the unformatted data comprises a plurality of menu and/or message items;
   formatting the unformatted data to produce a formatted data;
   assigning user roles to the plurality of menu and/or message items;
   transmitting the formatted data to the web part; and
   presenting the plurality of menu and/or message items collected from a plurality of separate web parts and saved as a single custom web part based on the assigned user roles, for use in a dynamic portal, under dynamic control of a separate administrative website.

2. The method of claim 1, wherein the web service call includes a Web Part ID.

3. The method of claim 1, wherein the web service call includes a User ID.

4. The method of claim 1, wherein the formatted data comprises at least a portion of a dynamically generated web portal.

5. The method of claim 1, wherein the database server maintains a data structure including the menu items, the message items, and the assignment of the message items and the menu items to the user roles.

6. The method of claim 5, wherein the data structure further includes an assignment of the user roles to a plurality of users, and assignment of the menu items to a plurality of menu groups, and an activity log.

7. The method of claim 1, further comprising transmitting simulated web portal content from the web service to an administration server.

8. The method of claim 1, wherein the database server is managed by an administration server capable of modifying the message items, the menu items, and user data.

9. A data processing system comprising a processor and accessible memory, the data processing system executing a web service configured to perform:
   receive a web service call from a web part;
   transmit a procedure call, corresponding to the web service call, to a database server;
   receive, from the database server, unformatted data corresponding to the procedure call, wherein the unformatted data comprises a plurality of menu and/or message items;
   format the unformatted data to produce a formatted data;
   assign user roles to the plurality of menu and/or message items;
   transmit the formatted data to the web part; and
   present the plurality of menu and/or message items collected from a plurality of separate web parts and saved as a single custom web part based on the assigned user roles, for use in a dynamic portal, under dynamic control of a separate administrative website.

10. The system of claim 9, wherein the web service call includes a Web Part ID.

11. The system of claim 9, wherein the web service call includes a User ID.

12. The system of claim 9, wherein the formatted data comprises at least a portion of a dynamically generated web portal.

13. The system of claim 9, wherein the database server maintains a data structure including the menu items, the message items, and the assignment of the message items and the menu items to the user roles.

14. The system of claim 13, wherein the data structure further includes the assignment of the user roles to a plurality of users, and assignment of the menu items to a plurality of menu groups, and an activity log.

15. The system of claim 1, further comprising transmitting simulated web portal content from the web service to an administration server.

16. A dynamic portal system, comprising
   a database server comprising a memory and a number of processors;
   an administration server; and
   a web services server,
   wherein the web services server is connected to communicate with a portal server, the database server and the administration server, and wherein the web services server is configured to perform via the number of processors:
   receive a web service call from a web part;
   transmit a procedure call, corresponding to the web service call, to a database server;
   receive, from the database server, unformatted data corresponding to the procedure call, wherein the unformatted data comprises a plurality of menu and/or message items;
   format the unformatted data to produce a formatted data;
   assign user roles to the plurality of menu and/or message items,
   transmit the formatted data to the web part; and
   present the plurality of menu and/or message items collected from a plurality of separate web parts and saved as a single custom web part based on the assigned user roles, for use in a dynamic portal, under dynamic control of a separate administrative website.

* * * * *